United States Patent
Lendel

Patent Number: 5,438,797
Date of Patent: Aug. 8, 1995

[54] VERTICAL PLANTER

[76] Inventor: George Lendel, 1651 S. Vivian St., Longmont, Colo. 80501

[21] Appl. No.: 232,949

[22] Filed: Apr. 25, 1994

[51] Int. Cl.6 ............................................. A01G 25/00
[52] U.S. Cl. ............................................. 47/82; 47/39
[58] Field of Search .................. 47/82, 83, 39, 395

[56] References Cited

U.S. PATENT DOCUMENTS

| | | | |
|---|---|---|---|
| 307,936 | 11/1884 | Fry | 47/82 |
| 1,928,799 | 10/1933 | Stevens | 47/39 |
| 2,152,869 | 4/1939 | Campbell | 47/82 |
| 2,542,555 | 2/1951 | Moores . | |
| 2,670,571 | 3/1954 | Waldron . | |
| 2,803,923 | 8/1957 | Pratt | 47/83 |
| 2,837,866 | 6/1958 | Esmay et al. . | |
| 3,076,289 | 2/1963 | Gallo . | |
| 3,076,290 | 2/1963 | Gallo . | |
| 3,137,095 | 6/1964 | Pearson . | |
| 3,293,798 | 12/1966 | Johnson, Sr. | 47/83 |
| 4,006,559 | 2/1977 | Carlyon, Jr. | 47/82 |
| 4,351,270 | 9/1982 | Sabin . | |
| 4,961,284 | 10/1990 | Williams . | |
| 5,136,807 | 8/1992 | Orlov . | |

FOREIGN PATENT DOCUMENTS

| | | | |
|---|---|---|---|
| 232681 | 8/1963 | Austria | 47/83 |
| 1204181 | 8/1959 | France | 47/39 |
| 1388537 | 12/1964 | France | 47/83 |
| 84938 | 3/1965 | France | 47/83 |
| 1441380 | 4/1966 | France | 47/83 |
| 239088 | 1/1979 | France | 47/83 |
| 2520972 | 8/1983 | France | 47/82 |
| 47788 | 4/1966 | Germany | 47/39 |
| 3906121 | 8/1990 | Germany | 47/39 |
| 2204785 | 11/1988 | United Kingdom | 47/39 |

OTHER PUBLICATIONS

CZECH Brochure—4 Pages.

Primary Examiner—Ramon S. Britts
Assistant Examiner—Joanne C. Downs
Attorney, Agent, or Firm—Rick Martin

[57] ABSTRACT

A vertical planter has a plurality of spaced apart tiered flower pots centered about a pole. The pole is segmented to allow disassembly and shipping. A support base is either a stand having legs or a cement plug. Dual support means for the flower pots include the dirt in the flower pots and support bars in the pole. The device can be built into a large capacity planter over seven feet tall and weighing over 400 pounds.

8 Claims, 1 Drawing Sheet

VERTICAL PLANTER

FIELD OF INVENTION

The present invention relates to vertically stacked flower pots having a central structural support.

BACKGROUND OF THE INVENTION

Gardeners often lack enough area for all of the vegetables, berries, herbs, and flowers they would like to grow. They often have less than a few hundred square feet for growing. They must use floor space as efficiently as possible.

The present invention provides a way to increase the gardening area in yards without sacrificing recreational space. The present invention is a structural unit for growing plants in minimal space, increasing average yield by 800% per square yard of floor space.

Once grown out the present invention looks like a lush green column, with plants and flowers growing in vertically stacked sections. The known origins of the present invention started with Frantisek Klabik, in the Czech Republic. The present invention represents a refinement of the original works of Frantisek Klabik.

The Klabik devices were hand hewn out of wood. The present invention provides gardeners pre-fabricated modular units which can be easily assembled and disassembled.

The present invention increases floor space garden yield by an average of 800%. One unit covers 1 to 1.5 square feet of ground space. In a six foot tall unit, one can grow:

80 lettuce or cabbage plants,
or 130 kohlrabi or yam plants,
or 30 to 40 cauliflower plants,
or 22 to 44 pounds of onion,
or 11 to 22 pounds of garlic,
or 55 to 110 pounds of tomato,
or 11 to 22 pounds of bell pepper.

Depending on weather conditions and timing, a six foot unit can yield as much as 17 to 25 square feet of garden space.

Although the average increase in yield for a six foot unit is 800% this varies from plant to plant. Yams, for example, are generally planted about a foot apart, which would give roughly 12 yams per square yard (including path space). The present invention covers about a square yard (including path space) and can yield 130 yams. This quantity would take more than 8 square yards in a conventional garden. The harvest is, therefore, increased by 800%.

Units can be designed to suit unique locations. Three-foot modular sections can be stacked to any height. A 9 or 12 foot high unit can increase the yield of a given floor space by 2000% to 3000%. However, it might be difficult to tend plants at such a height.

The present invention can increase the total planting area inside of a greenhouse by 100% to 200%. By placing units six feet apart in a greenhouse, the overall planting area can be increased without creating excessive areas of partial shade. Areas shaded by the units do not prevent growth of plants on the ground even during spring. In the summer months, some shade actually benefits these plants.

Units can be placed in barren, rocky and sloped areas, where growing would otherwise be difficult or impossible. Full productivity is not dependent on the local terrain. Terracing removing rocks and improving ground soil fertility are unnecessary.

The present invention decreases weed growth by 90% without the use of chemical herbicides. Cultivation of annual plants is often associated with the time-consuming, never-ending task of weeding. Because of its unique construction, the present invention reduces weed growth from planting time through the harvest. Weeds can only grow in the small outer rim of each section. During the first two months of growth, weeding a unit three or four times is more than sufficient. The weeds are still small and the growing medium is very light, so their removal is quick and easy. Later in the season, the density of plant growth inhibits additional weeds from developing.

The present invention teaches an organic growing technique. Typically when converting from commercial to organic growing methods, it can take years to detoxify the soil and increase the content of its organic matter. With the present invention, however, plants can be cultivated organically right from the start without sacrificing quality or productivity.

The present invention allows most gardening work to be performed while standing. Gardeners who spend hundreds of hours kneeling or bent over in the garden will appreciate this fact. The present invention is "user-friendly" to older gardeners and handicapped gardeners. Working on a unit is also easier because the plants are visible and accessible from all sides.

A single unit can grow a great variety of plants, including all kinds of vegetables, flowers, strawberries, herbs and even potatoes. Older methods of cultivation were often limited to a specific type of plant. The present invention also lends itself to the cultivation of companion plants and polycultures.

The vertical flower pots create "microclimates" on the different sides of each unit. Sun-loving plants such as tomatoes and basil thrive on the south side of each section, while lettuce and other cooler season crops prefer the north side. Thus, the present invention allows each plant to be put in its most favorable niche.

The present invention teaches the efficient use of resources. The flower pots utilize composted soil, water, and soil amendments economically and effectively by concentrating these substances right where they are needed, close to plant roots.

When one spreads two wheelbarrows of compost over ten square yards of garden, one increases the compost content of the soil by just a slight margin. By using the same amount of compost in the present invention, one immediately increases the ratio of compost to soil by 50%.

Similarly, when one waters a garden, the water tends to percolate down below the reach of many plant roots. This water also carries vital nutrients away from where they are needed in the topsoil, and may eventually cause salting in the subsoil layer. With the present invention all the water and nutrients applied go directly to the plant roots.

The configuration of the vertical flower pots also allows the plants to get maximum ventilation. This increases contact of the leaves with carbon dioxide, thus facilitating photosynthesis thereby and increasing plant growth.

The present invention eliminates crop damage from mice and other ground dwelling pests.

The present invention requires very little maintenance. The units are productive for up to three years without replacing the growing medium. One can save time and hard work in preparing a garden, digging, hoeing, weeding, and caring from the soil.

A SUMMARY OF THE MOST RELEVANT PATENTS

U.S. Pat. No. 2,542,555 (1951) to Moores discloses a small square made Of porous vegetable matter. The square has a central hole filled with loam for germinating seeds. The squares may be stacked vertically and separated by a sheet to begin the germination process. Then the squares may be individually shipped.

U.S. Pat. No. 2,670,571 (1954) to Waldron discloses a circular flower growing container(s) which can be vertically stacked. Downward planted flowers turn upward toward the light to create a pyramid shaped floral arrangement.

U.S. Pat. No. 2,803,923 (1957) to Pratt discloses a vertical post which supports a pyramidal group of walled structures. The walled structures act as flower pots. Each walled structure is supported by a plurality of central arms that attach to the vertical post.

U.S. Pat. No. 2,837,866 (1958) to Esmay et al. discloses a terraced soil container having soil containing bands arranged into a conical structure. A sheet metal pyramid base supports the bands of soil.

U.S. Pat. No. 3,076,289 (1963) to Gallo discloses a stackable flower pot. No common central vertical pole is disclosed.

U.S. Pat. No. 3,076,290 (1963) to Gallo discloses stackable flower pots using detachable supporting legs.

U.S. Pat. No. 3,137,095 (1964) to Pearson discloses a plurality of open top polygonal flower pots which are stackable.

U.S. Pat. No. 3,293,798 (1966) to Johnson, Sr. discloses a vertical tiered sectional planter. Each retaining wall and bottom container is supported by the member below. A common central vertical pole is used to transport water from layer to layer.

U.S. Pat. No. 4,351,270 (1982) to Sabin discloses a cone shaped terrarium made of a transparent inverted cone shaped shell.

U.S. Pat. No. 4,961,284 (1990) to Williams discloses a plant growing receptacle having a rigid frame and inner liner.

U.S. Pat. No. 5,136,807 (1992) to Orlov discloses a stackable plant container apparatus having no central support means.

None of the known prior art allows the quick assembly/disassembly of a vertical planter which can handle hundreds of pounds of dirt. Thus, the present invention meets the long sought market need of a high volume vertical planter which can be commercially packaged and shipped to consumers worldwide.

SUMMARY OF THE INVENTION

The main object of the present invention is to provide a collapsible vertical planter capable of handling hundreds of pounds of dirt.

Another object of the present invention is to provide a stable base for the vertical planter.

Yet another object of the present invention is to provide a water basin for the vertical planter.

Other objects of this invention will appear from the following description and appended claims, reference being had to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
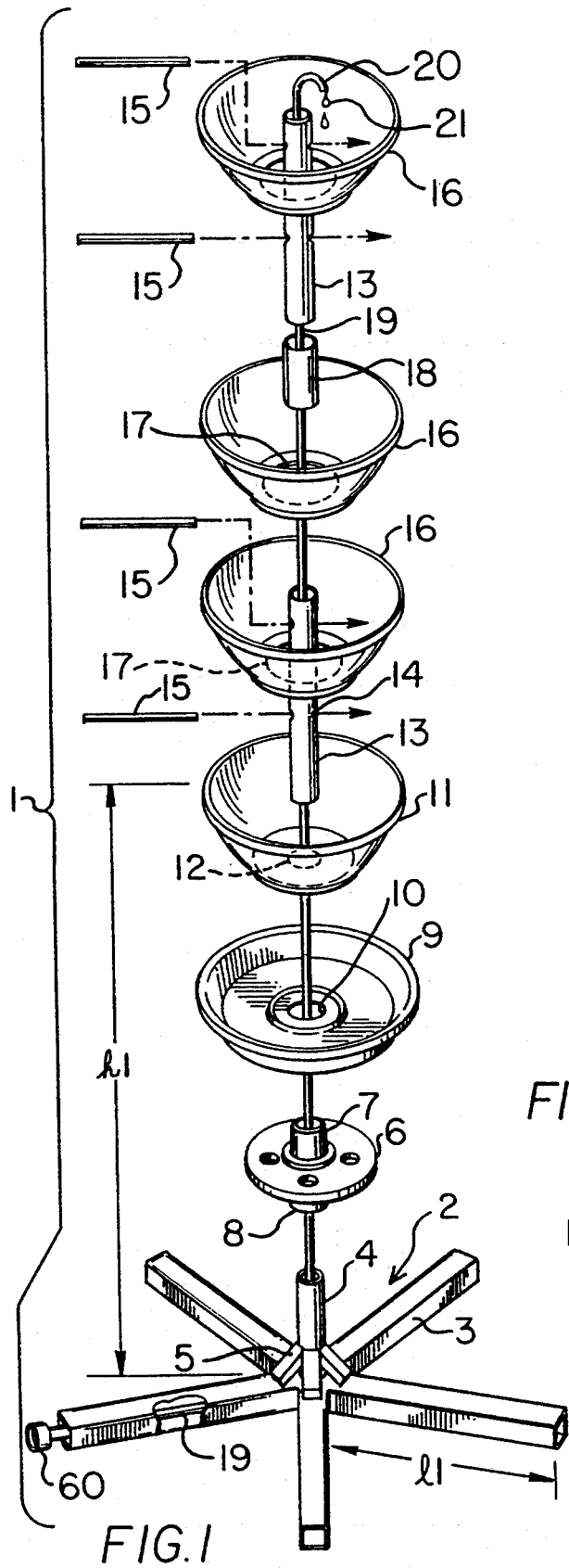
FIG. 1 is an exploded perspective view of the vertical planter.

Referring first to FIG. 1 a vertical planter 1 is shown in the preferred embodiment in an exploded view. The assembled height L is nominally four feet. This is a good height for a medium capacity planter on a patio where children could possibly climb on the planter. The base assembly 2 is comprised of five legs 3 each having a nominal length $l_1$ of eighteen inches. The legs form a solid platform for the vertical support post 4. Vertical support post 4 is supported by stanchions 5.

Disk 6 is slidingly engaged atop vertical support post 4 by means of sleeve 8. Disk 6 also has a vertical sleeve 7 into which pipe segment 13 fits. A water basin 9 having a center hole 10 rests atop disk 6. A dirt holding flower pot 11 has a center hole 12 which is substantially the same diameter as pipe segment 13. This design provides for the centering of flower pot 11 in water basin 9.

Figure 2:
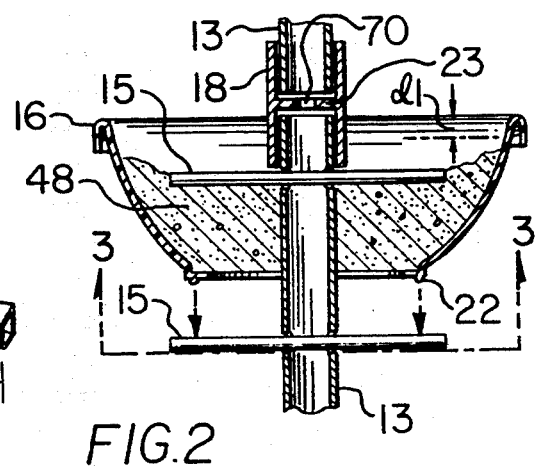
FIG. 2 is a sectional view of one flower pot and support assembly in the vertical planter of FIG. 1.

All the flower pots 16 have large center holes 17 in order to allow water 21 to seep down from one flower pot 16 to the flower pot beneath. Flower pots 16 are supported in two fashions. First there is dirt not shown in each flower pot which is piled to about $\frac{3}{4}$ inch from the top of each flower pot 16. This is shown in FIG. 2 with dirt 48 piled to a level where $d_1 = \frac{3}{4}$ inch. The second support means is bar 15 which extends through hole 14 to just beyond the circular periphery 17 at the bottom of flower pot 16. FIG. 2 shows ridges 22 which stabilize the bar 15. It is very important to stack the flower pots 16 in a level and centered manner around pipe segments 13. The vertical planter 1 can achieve a weight of over 400 pounds. It can be a hazard if one accidentally bumps into a vertical planter and topples it over.

The vertical planter 1 is shown with an optional watering hose 19 having an inlet nozzle 60 and an outlet port 20.

Referring next to FIG. 2 a flower pot 16 has dirt 48 stacked to the height of bar 15. The locking collar 18 holds the pipe segments 13 together. The locking collar 18 has a central stop 23 functioning to allow the pipe segments 13 to fully seat inside locking collar 18. In FIG. 2 a hole 70 allows the optional hose 19 to pass therethrough.

The flower pots 11, 16 are preferably made of thin plastic. The base assembly 2, pipe segments 13 and locking collar 18 are preferably made of aluminum.

Figure 4:
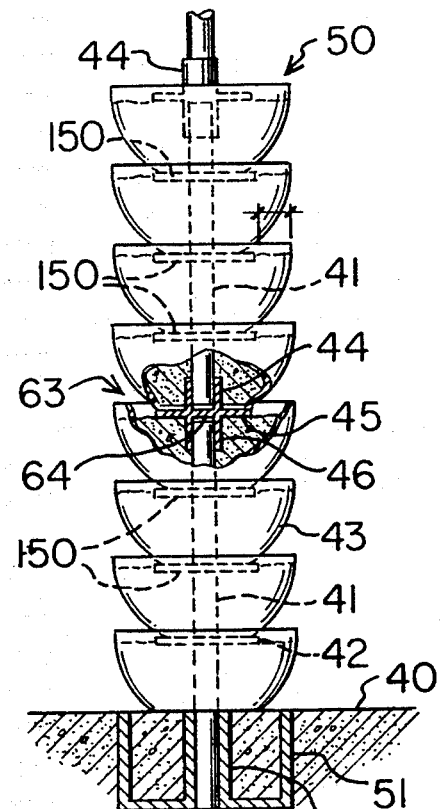
FIG. 4 is a side plan view of an alternative embodiment.
Figure 3:
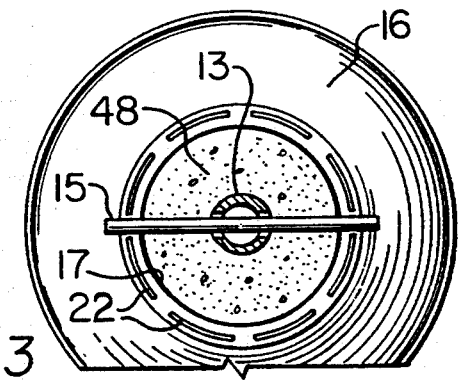
FIG. 3 is a bottom view of a flower pot taken along line 3—3 of FIG. 2.

FIG. 4 shows an alternate embodiment, vertical planter 50. It is placed directly into the ground 40. The vertical planter 1 of FIG. 1 could also be supported in a like manner by inserting the pipe segments 13 into the ground. In the ground is a cement block 51 having a support tube 52. The pipe segment 41 is supported by support tube 52.

Flower pots 43 are stacked atop one another and supported by the dirt beneath each one. A secondary support means is provided by bar 150. At the pipe segment joint 63 the bar 150 is not used. Instead a multi-function collar 64 is used. The upper and lower support sleeves 44 and 46 respectively are affixed to the platform 45. The platform 45 provides a support means to the flower pot 43 above it. The upper and lower support sleeves 44, 46 join the pipe segments 41. This embodiment can be used in a greenhouse environment and stacked to over seven feet in height.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A vertical planter comprising:
   a support base;
   a plurality of vertical pipe segments of equal outside diameter;
   said pipe segments further comprising a plurality of locking collars therebetween;
   said support base further comprising means for vertically supporting said pipe segments;
   a plurality of tiered vertically spaced apart flower pots centered about said pipe segments;
   dual support means for each of said flower pots with the exception of a lowermost flower pot comprising first a pile of dirt in each flower pot,
   and second a support bar means beneath each flower pot; and said support bar means further comprising a hole in each of said pipe segments and a bar through each of said holes the lowermost flower pot having dirt therein and including means for supporting said dirt within said lowermost flower pot.

2. The vertical planter of claim 1 wherein said means for vertically supporting said pipe segments further comprises a vertical support post affixed to said support base.

3. The vertical planter of claim 1 wherein said support base further comprises a water basin.

4. The vertical planter of claim 1 further comprising a watering hose inside said pipe segments and having an outlet port above said plurality of flower pots.

5. The vertical planter of claim 1 wherein said support base further comprises legs.

6. The vertical planter of claim 1 wherein said support base further comprises a concrete plug.

7. A vertical planter comprising:
   a base support means;
   a plurality of pipe segments of equal outside diameter vertically supported by said base support means;
   a multi-function platform joining said pipe segments;
   a plurality of tiered spaced apart flower pots centered about said pipe segments; dual support means for each of said flower pots with the exception of a lowermost flower pot comprising first a pile of dirt in each flower pot, and
   member selected from the group consisting of said multi-function platform and a support bar means; and
   said base support means further comprising a concrete plug having a support hole the lowermost flower pot having dirt therein and including means for supporting said dirt within said lowermost flower pot.

8. The vertical planter of claim 7 wherein said support bar means further comprises a hole in each of said pipe segments and a bar through each of said holes.

* * * * *